(12) United States Patent
Goldberg et al.

(10) Patent No.: US 8,730,456 B2
(45) Date of Patent: May 20, 2014

(54) COMPACT MONOSTATIC OPTICAL RECEIVER AND TRANSMITTER

(75) Inventors: Lew Goldberg, Fairfax, VA (US); Stephen Chinn, Alexandria, VA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 748 days.

(21) Appl. No.: 12/942,385

(22) Filed: Nov. 9, 2010

(65) Prior Publication Data

US 2012/0154783 A1   Jun. 21, 2012

(51) Int. Cl.
*G02B 6/32* (2006.01)
*G01C 3/08* (2006.01)
*G02B 6/26* (2006.01)

(52) U.S. Cl.
USPC ............... 356/4.01; 385/33; 385/29; 385/28

(58) Field of Classification Search
USPC ................................ 356/4.01; 385/33, 29, 28
See application file for complete search history.

(56) References Cited

U.S. PATENT DOCUMENTS

| | | | |
|---|---|---|---|
| 4,815,079 A * | 3/1989 | Snitzer et al. | 372/6 |
| 5,999,673 A | 12/1999 | Valentin et al. | |
| 6,477,295 B1 | 11/2002 | Lang et al. | |
| 7,110,108 B2 * | 9/2006 | Puppels | 356/301 |
| 7,447,408 B2 * | 11/2008 | Bouma et al. | 385/123 |

FOREIGN PATENT DOCUMENTS

GB       2218589 A  * 11/1989

OTHER PUBLICATIONS

Roberts et al, "Dual numerical aperture confocal operation of a moving fibre bar-code reader," Electronics Letters, 1999, vol. 35, pp. 1656-1657 http://ieeexplore.ieee.org/xpl/freeabs_all.jsp?arnumber=807053&isnumber=17454.

* cited by examiner

*Primary Examiner* — Isam Alsomiri
*Assistant Examiner* — Vicente Rodriguez
(74) *Attorney, Agent, or Firm* — Richard J. Kim

(57) ABSTRACT

A compact monostatic optical transmitter/receiver device simultaneously transmits an optical beam and collects returning light using a single lens or optical aperture. The system provides automatic alignment of the transmit and receive aperture and is compatible with fiber-coupled laser sources. Transmit light is emitted from a double-cladding fiber core while received light is coupled into the inner cladding of the same fiber. The transmit light propagating in the core and the received light propagating in the inner cladding are separated by the means of a diplexer comprised of a fused fiber coupler or a fiber-coupled micro-optic device.

17 Claims, 5 Drawing Sheets

COMPACT MONOSTATIC OPTICAL RECEIVER AND TRANSMITTER

GOVERNMENT INTEREST

The invention described herein may be manufactured, used, sold, imported, and/or licensed by or for the Government of the United States of America.

FIELD OF THE INVENTION

This invention relates to monostatic optical transmitter/receivers as they relate to laser detection.

BACKGROUND OF THE INVENTION

A typical method of operation for Laser Detection and Ranging (LADAR) system or a Laser Rangefinder (LRF) is to emit a short (typically 1-10 ns), high peak power optical pulse in a narrow beam and detect its reflected return from a target. The time delay between emission and detection provides the range to the target, and knowledge of the beam direction provides target bearing information. The transmitted beam is collimated to provide low divergence to the target so that the incident spot is sufficiently small to provide required lateral resolution.

In general, the target will reflectively scatter the incident beam into a large solid angle, so the amount of reflected power detected at the LADAR system will be proportional to the area of the receiver aperture. If the transmitted and received beams share a common aperture the system is described as monostatic. This type of system avoids misalignment and parallax problems common to LADARs and LRFs which have separate transmit and receive apertures (described as bistatic). It makes manufacturing of LIDARs and LRFs simpler since it eliminates the needed for time consuming precise alignment of the transmit and receive apertures required with bistatic systems. In monostatic operation, an optical means has to be provided for separating the transmitted and received beams before the aperture, so that the transmitted beam does not lose energy or degrade the operation of the photodetector, and the received intensity is directed primarily to the photodetector. In principle, this optical diplexing function might be as simple as a beam-splitter (which has excessive round-trip optical loss) or more complex (such as a non-reciprocal optical circulator).

SUMMARY OF THE INVENTION

For the exemplary systems described herein, diplexers comprised of a fused fiber coupler or a fiber-coupled micro-lens structure are variously used to efficiently separate the transmitted and the received light.

In one aspect, a monostatic laser system is disclosed, comprising a photodetector fiber-coupled to receive a received light; a light source fiber-coupled to transmit a transmitted light; a diplexer fiber coupled to the photodetector to separate the received light, fiber-coupled to the light source to separate the transmitted light, and fiber-coupled on an output side of the diplexer; and a transmit/receive lens having one side facing a flat-polished end of said fiber coupled on said output side of the diplexer.

In another aspect, an optical diplexer is disclosed based on a fused fiber coupler to separate a received light propagating in a receive direction from a transmit light that is propagating in a transmit direction, and function as a fiber-based monostatic transmitter/receiver. Such a diplexer comprises a double-cladding fiber having a core for coupling at one end to an optical transmitter source; and a multimode-core fiber having a single cladding for coupling at one end to a receiver photodiode, the double-cladding fiber and the multimode-core fiber being fused together to be in optical contact with each other in a coupling region to allow optical power transfer between an inner cladding of the double-cladding fiber and the multimode-core fiber. An outer cladding of the double-cladding fiber and a jacket of the multimode-core fiber are stripped away in the coupling region to allow optical contact or fusion of the inner cladding of the double-cladding fiber and the multimode-core fiber.

Yet, in another aspect, a monostatic laser system is disclosed based on a fiber-coupled micro-lens structure. Such a monostatic laser systems comprises a multimode fiber with its lens face facing a fiber side of a receiver lens, and a receiver face of the multimode fiber facing a receiver photodiode; a transmitter fiber having a core with its lens face facing a fiber side of a transmitter lens, and a transmitter face of the transmitter fiber facing an optical transmitter source; a double-cladding fiber having a core with its lens face facing a fiber side of an output lens, and an output face of the double-cladding fiber facing an output side; and a diplexer based on an angled mirror configured in relation to said transmitter lens, receiver lens and output lens. Said transmitter lens and said output lens are arranged in an imaging configuration, where a near-field intensity distribution from the core of the transmitter fiber is first imaged by said transmitter lens at half-point between said transmitter lens and said output lens, where transmitted light from said optical transmitter source passes through a hole in said angled mirror.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
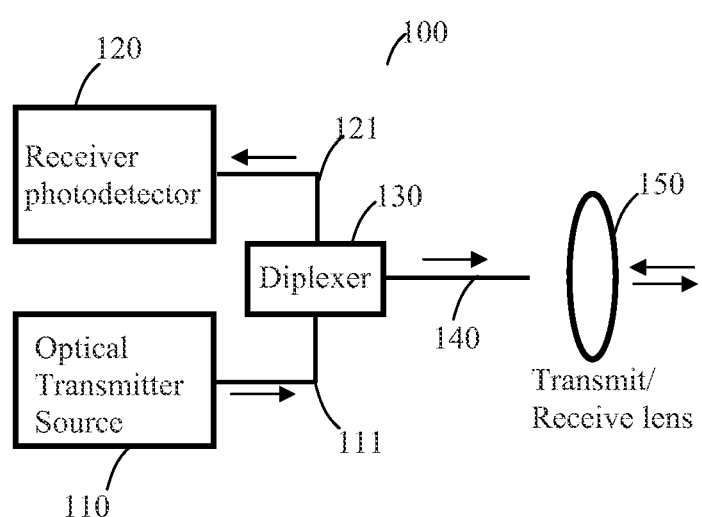
FIG. 1 shows a block diagram of an exemplary monostatic Laser Detection and Ranging (LADAR) system or a Laser Rangefinder (LRF)

A block diagram of an exemplary monostatic Laser Detection and Ranging (LADAR) system or a Laser Rangefinder (LRF) is shown in FIG. 1. As exemplified in FIG. 1, such an exemplary system 100 is comprised of a photodetector 120 for the received light, a light source 110 for the transmitted light, and a diplexer 130 to separate the received light from the transmitted light.

As disclosed here, the detector 120, light source 110 and diplexer 130 are fiber coupled. The light source 110 can be a fiber master-oscillator/power-amplifier (MOPA) device operating at near 1550 nm, or 1060 nm, seeded with pulse modulated laser diode. The fiber 140 on the output (right) side of the diplexer can have a double-cladding structure. As shown in FIG. 1, a flat-polished end of an exemplary double-cladding fiber (DCF) 140 faces a transmit/receive lens 150.

Figure 2:
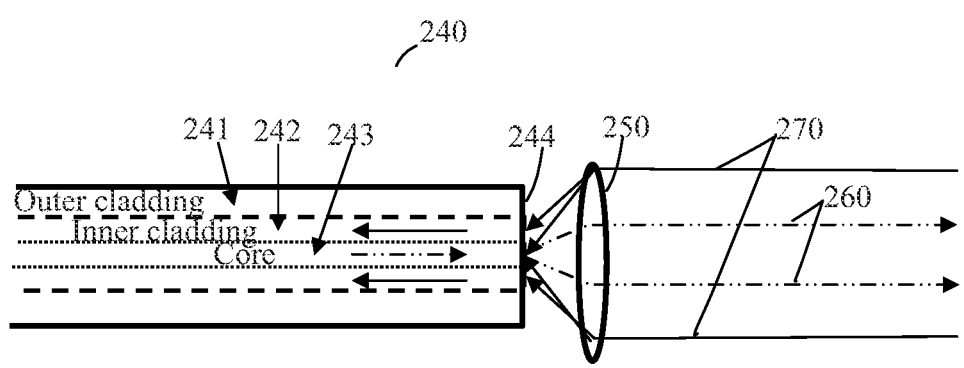
FIG. 2 shows an exemplary optical receiver/transmitter aperture based on double-cladding fiber.

FIG. 2 shows such an exemplary fiber 240 on the output side of the diplexer having a double-cladding structure comprising an outer cladding 241, an inner cladding 242 and a core 243. FIG. 2 also show the flat-polished end 244 of the double-cladding fiber (DCF) 240 facing the TX/RX lens 250.

An exemplary DCF 240 can be comprised of a small diameter core 243, typically in the range of $d_{cr}$=5-20 µm with a numerical aperture of $NA_{core}$=0.08-0.16, and a large diameter $d_c$, higher NA inner cladding 242, typically $d_d$=50-500 µm and $NA_{clad}$=0.4-0.7 respectively. The large difference in the NAs of the core and the inner cladding has been used previously to implement a dual numerical aperture confocal barcode scanner.

Transmitter light emerges from the DCF core 243 and is collimated by the TX/RX lens 250. The lens focal length f is chosen to give a desired collimated beam diameter and divergence angle. The lens NA is chosen to be equal to the NA of the DCF cladding (e.g., 242), which is substantially larger than DCF core 243 NA, so that only the central portion of the lens 250 is used to collimate the transmit beam (e.g., 260). For a specific lens focal length f the field of view (FOV) of the receiver (e.g., 120) is given by the inner cladding diameter, FOV=fd$_c$.

Light reflected (e.g., 270) from a remote diffused surface is collected by the lens (e.g., 250) and focused onto the flat-polished DCF end (e.g., 244). Rays focused by the lens (e.g., 250) conic from the full lens aperture, and their incidence angles cover the full range of the lens NA. Of those rays that fall on the core region of the DCF only ones within the NA of the core are launched into the core (e.g., 243), with the rest captured guided by the high inner DCF cladding (e.g., 242). Because the inner core (e.g., 243) and its cladding (e.g., 242) are concentric, at the fiber tip they are automatically aligned with respect to the common monostatic TX/RX lens (e.g., 250) for any position of the fiber tip (e.g., 244) in the focal plane of the lens.

The fraction of received light power (e.g., 270) collected by the lens (e.g., 250) that is coupled into the inner cladding (e.g., 242) is given by:

$$1-(NA_{core}/NA_{clad})^2$$

For typical numerical aperture ratios described above, substantially all of the collected light is coupled into the inner cladding (e.g., 242) and only a small fraction is coupled into the fiber core (e.g., 243). For a typical inner cladding NA=0.47 and a core NA=0.12, about 93% of light collected by the TX/RX lens (e.g., 250) can be estimated to couple into the inner cladding (e.g., 242).

Actually, the fraction of the light power coupled into the inner cladding (e.g., 242) can be expected to be higher than that calculated from the NA ratio alone. Since collected light fills the entire lens aperture, for a lens with non-diffraction limited performance the focused spot diameter will be significantly larger than the fiber core. This "spill-over" effect reduces the fraction of received light that couples into the core, regardless of incidence angles of the focused rays. The lens surface shape can be intentionally designed so that it performs near the diffraction limit over a small fraction of its diameter but operates far from diffraction limit over the remaining surface. For example, a lens with a numerical aperture of 0.5 can be made to produce near-diffraction limited beam collimation for light emerging from DCF core with an NA=0.12, but produce a focused spot that is significantly larger than diffraction limit for collected light filling the entire lens surface corresponding to an NA of 0.5.

An integral aspect of the disclosure is the diplexer (e.g., 130). The variously disclosed diplexer performs the function of separating the received light (e.g., 121) from the transmit light (e.g., 111) that is propagating in the opposite direction. Ideally, the diplexer should introduce minimal loss for both the received light and transmitter light: its construction should be compact, insensitive to vibrations and temperature variations, and compatible with fiber coupled light sources and the double cladding fiber-based monostatic TX/RX shown in FIG. 2.

Figure 3A:
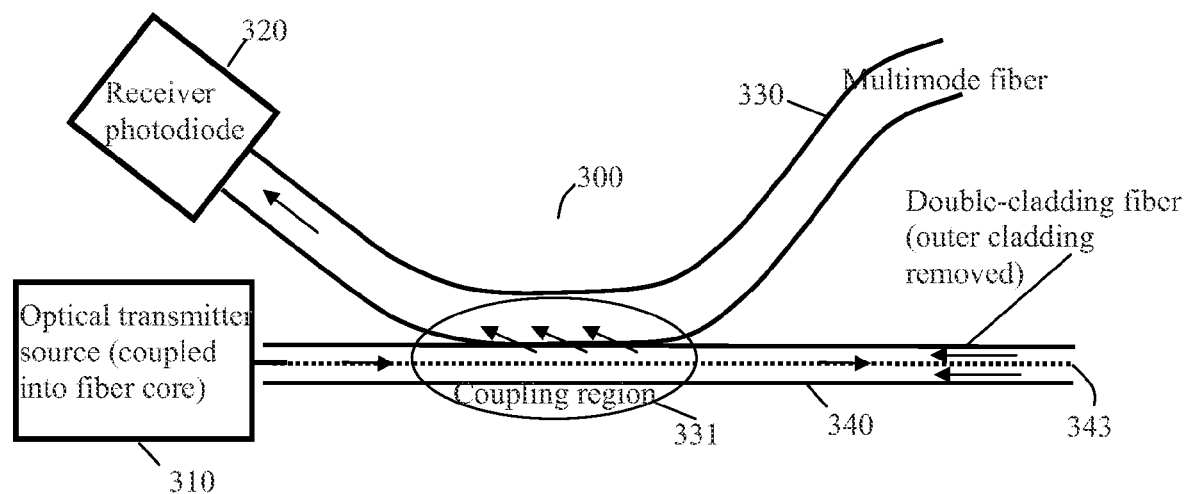
FIG. 3*a* shows an exemplary diplexer configuration based on a fiber coupler.
Figure 3B:
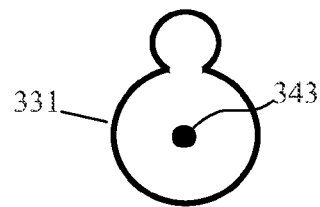
FIG. 3*b* shows an exemplary cross-sectional view of a coupling region of the exemplary diplexer configuration based on a fiber coupler.

The first exemplary diplexer configuration is shown in FIG. 3a. FIG. 3b shows a cross-sectional view of an exemplary coupling region of a diplexer configuration based on such a fiber coupler.

Such an exemplary all-fiber device can be made with two fiber types, one with a DCF structure (e.g., 340) and the other with a single-cladding/multimode-core (MM) structure (e.g., 330). The two fibers are fused together or are in optical contact with each other in order to allow optical power transfer between the inner cladding of the double-cladding fiber (e.g., 340) and the MM fiber (e.g., 330). The outer cladding of the DCF (e.g., 340) and jacket of the MM fiber (e.g., 330) are stripped away in the coupling region (e.g., 331) to allow optical contacting or fusion of the inner cladding of the double-cladding fiber (e.g., 340) and the MM fiber (e.g., 330). The coupler (e.g., 300) is fabricated so that strong optical coupling (e.g., 331) is achieved between the inner cladding of the DCF (e.g., 340) and the MM fiber (e.g., 330), without causing significant perturbation of the signal light propagating in the DCF core (e.g., 343). This assures that there is no significant light loss for the transmitter light coupled from the optical source (e.g., 310, such as a fiber MOPA) into the core (e.g., 343) of the double-cladding fiber (e.g., 340). The MM fiber output is coupled into the receiver photodiode (e.g., 320).

For a sufficiently long coupling length, the fraction of power propagating in the multimode DCF inner cladding (e.g., 340) that cross-couples into the MM single cladding fiber (e.g., 330) is given by, $$A_M/(A_{DCF}+A_M)$$

where $A_{DCF}$ is the cross-sectional area of the DCF inner cladding and $A_M$ is the cross-section area of the MM fiber. For a 200 µm diameter of MM fiber and 100 µm DCF inner cladding diameter, this coupling fraction is 80%. While the 20% loss in the received signal is acceptably low for most LIDAR and LRF systems, a larger coupling fraction is often desirable and can be achieved by several techniques. For the first exemplary embodiment, the diameter of the MM fiber (e.g., 330) can be increased, although this is not always desirable since the output of MM fiber output is coupled into a small diameter photodiode (e.g., 320), with a typical active area diameter of 50-80 µm required for frequency a response of ~1 GHz. For the second exemplary embodiment, the inner cladding of the DCF (e.g., 340) can be reduced to achieve higher cross-coupling ratio, although this is also not always desirable since a smaller DCF reduces the FOV of the monostatic TX/RX, and also makes the fiber more difficult to work with.

Figure 4:
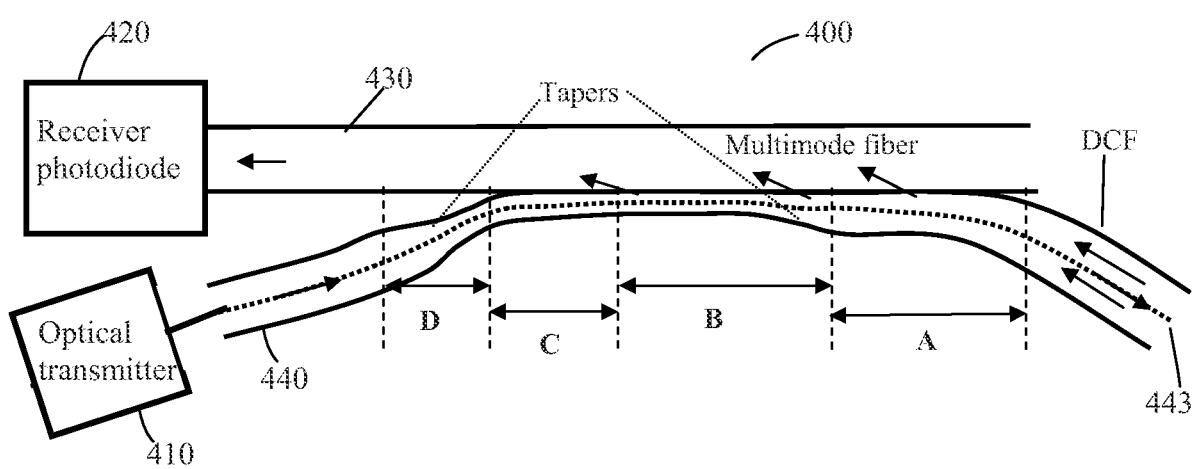
FIG. 4 shows another exemplary diplexer configuration based on a fiber coupler.

A third exemplary embodiment is shown in FIG. 4. In order to increase the cross-coupling fraction, the exemplary configuration shown in FIG. 4 uses a modified coupler structure that circumvents these limitations. As in the previously described coupler, the coupler 400 in FIG. 4 can be comprised of a DCF fiber (e.g., 440) that is fused to, or is in optical contact with, a single cladding MM fiber (e.g., 430). In this exemplary modified coupler, however, the DCF (e.g., 440) is gradually tapered down to a sufficiently small diameter to achieve a desired cross-coupling ratio. Outside the cross-coupling section, the DCF (e.g., 440) can have a larger diameter for easy handling and to maintain large FOV for the receiver (e.g., 420). The coupler (400) in FIG. 4 can have distinct sections, e.g., 4 sections as labeled A,B,C,D. As exemplified, coupling between fibers occurs in sections A-C. Section A can have an un-tapered length of DCF (e.g., 440) in order to allow high NA rays in the DCF inner cladding to couple into the MM fiber (e.g., 430) before reaching the down-taper. This is required since the down-taper increases the NA of the inner cladding light by the taper ratio, or the ratio of inner cladding diameter at the wide end of the taper to that at the narrow end. Section A assures that light propagating through the DCF taper does not exceed the NA of the DCF inner cladding. The length of coupling section B has a DCF down-taper, and section C also has a down-tapered DCF to achieve maximum DCF-MM fiber cross-coupling allowed by the fiber cross-sectional area ratio. In section D the down-tapered DCF is separated from the MM fiber before reaching the up-taper. This coupler feature is required to prevent light that is already in the MM fiber (e.g., 430) from coupling back into the DCF (e.g., 440).

To avoid losses for the DCF core (e.g., 443) in the coupler 400 shown in FIG. 4, the taper fraction has to be sufficiently small so that all modes that are launched into it from the light source (e.g., 410) remain well confined in the core (e.g., 443). For a typical single mode core with a typical diameter of 10 µm and NA=0.12, this means that the taper ratio should be below approximately 2.0.

Figure 5:
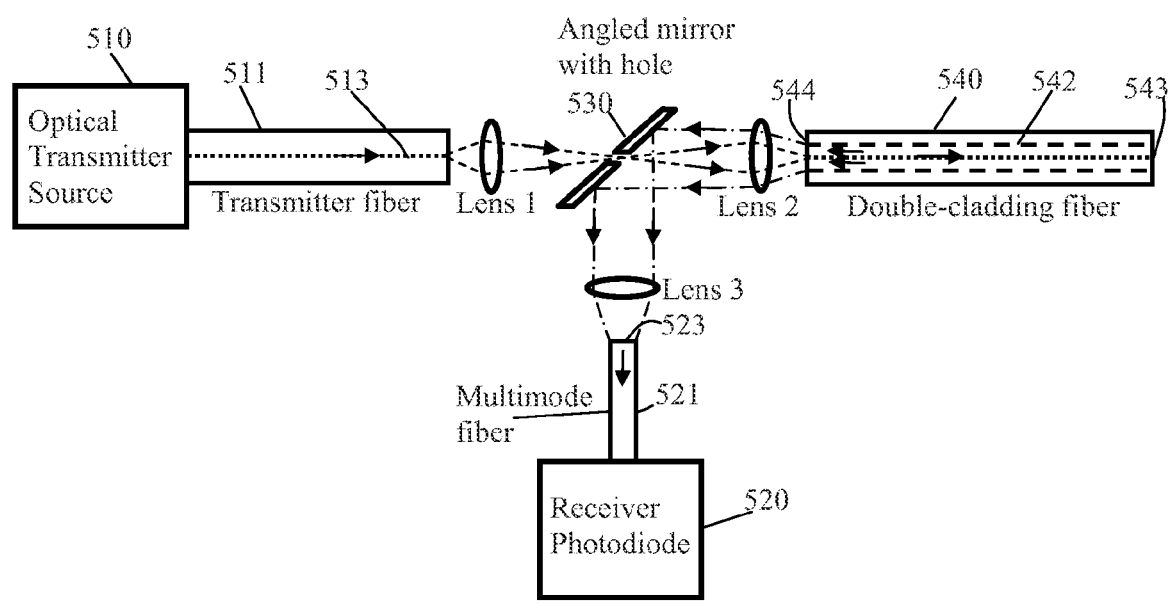
FIG. 5 shows an exemplary diplexer based on micro-lenses.

Another exemplary embodiment of a diplexer, as shown in FIG. 5, uses micro-lenses. In this exemplary arrangement the transmitter light emerging from the fiber core (e.g., 513) is coupled into the core (e.g., 543) of a DCF fiber (e.g., 540) using a pair of lenses 1 and 2. The lenses can be arranged in an imaging configuration, where the near-field intensity distribution from the core (e.g., 513) of the fiber connected to the source (e.g., 510) is first imaged by lens 1 at half-point between the two lenses, where it passes through a hole in an angled mirror (e.g.; 530). The transmitted light is then imaged onto the face (e.g., 544) of the DCF 540 by lens 2. If the cores (e.g., 513 & 543) of the two fibers are identical, then nearly complete (discounting Fresnel losses) core-to-core coupling efficiency can be achieved with such 1:1 imaging magnification. For dissimilar core diameters other magnification factors can be used to match the mode field diameters of the two fiber cores.

The received light emerging from the inner cladding (e.g., 542) of the DCF is imaged onto the face of a MM photo-receiver fiber (e.g., 521) by the lens pair 2, 3. An image of the near-field distribution of the DCF is imaged onto the angled mirror (e.g., 530) by lens 2, and after reflection is re-imaged onto the face (e.g., 523) of the MM fiber by lens 3. The MM fiber diameter, DCF inner cladding diameter and magnification factor of the lens pair 2, 3 are chosen so that the image of the DCF inner cladding matches the MM fiber diameter. A small fraction of the received light is lost because it falls on the hole in the diplexer mirror (e.g., 530). This fraction is given by the ratio between the core and inner cladding areas $A_{core}/(A_{DCF})$, which for a 10 µm core and a 100 µm cladding corresponds to a loss of only 1%.

It is obvious that many modifications and variations of the present invention are possible in light of the above teachings. It is therefore to be understood that within the scope of the appended claims, the invention may be practiced otherwise than as described.

What is claimed is:

1. A monostatic laser system, comprising:
a photodetector fiber coupled to receive a received light;
a light source fiber coupled to transmit a transmitted light;
a diplexer fiber coupled to the photodetector to separate the received light, fiber coupled to the light source to separate the transmitted light, and a double-cladding fiber coupled on an output side of the diplexer, wherein said double-cladding fiber comprises an outer cladding, an inner cladding having a numerical aperture range of about 0.4 to 0.7, and a core having a numerical aperture range of 0.08 to 0.16; and
a transmit and receive lens having one side facing a flat end of said fiber coupled on said output side of the diplexer, wherein the transmitted light emerges from the flat end towards the one side of said transmit and receive lens, and is collimated by said transmit and receive lens, wherein a focal length of said lens is chosen to yield a desired collimated beam diameter and divergence angle.

2. The system according to claim 1, wherein said monostatic laser system is a monostatic laser detection and ranging system for laser range finding.

3. The system recited in claim 1, wherein the light source is based on a fiber amplified master oscillator device operating at near 1550 nm, or 1060 nm, seeded with pulse modulated laser diode.

4. The system recited in claim 1, wherein said diplexer is based on a fused fiber coupler or a fiber-coupled micro-lens structure.

5. The system recited in claim 1, wherein said core has a small diameter in the range of 5 to 20 µm, and wherein said inner cladding has a large diameter range of about 50 to 500 µm.

6. The system recited in claim 1, wherein a numerical aperture of the lens is chosen to be equal to a numerical aperture of a cladding of said fiber coupled on the output side of the diplexer, which is substantially larger than a numerical aperture of a core of said fiber coupled on the output side of the diplexer, thereby a central portion of the lens is used to collimate the transmitted light.

7. The system recited in claim 1, wherein light diffusely reflected from a remote surface is collected by the lens and focused onto the flat end of said fiber coupled on said output side of the diplexer.

8. The system recited in claim 7, wherein of said light focused onto the flat end of said fiber, only a portion within a numerical aperture a core of said fiber is launched into the core, another portion being guided by a cladding of said fiber, wherein said inner core and said cladding are concentric for ease of alignment with respect to a focal plane of the lens.

9. The system recited in claim 8, wherein for a typical inner cladding numerical aperture of about 0.47 and a core numerical aperture of about 0.12, more than 93% of light collected by the lens can be coupled into the cladding.

10. The system recited in claim 1, wherein the lens surface is shaped so that it performs near a diffraction limit over a small fraction of its diameter but operates far from diffraction limit over the remaining surface.

11. The system recited in claim 1, wherein a lens with a numerical aperture of about 0.5 produces near-diffraction limited beam collimation for light emerging from a core of said fiber coupled on said output side of the diplexer, wherein a numerical aperture of said core is about 0.12, producing a focused spot that is significantly larger than diffraction limit for collected light filling the entire lens surface corresponding to a numerical aperture of 0.5.

12. An optical diplexer based on a fused fiber coupler to separate a received light propagating in a receive direction from a transmit light that is propagating in a transmit direction, and function as a fiber-based monostatic transceiver, said diplexer comprising:
   a double-cladding fiber having a single mode core with a diameter of about 10 μm and numerical aperture of about 0.12 for coupling at one end to an optical transmitter source, wherein the double-cladding fiber is gradually tapered down in diameter to a taper ratio below 2.0 and achieve a desired cross-coupling ratio; and
   a multimode-core fiber having a single cladding for coupling at one end to a receiver photodiode, the double-cladding fiber and the multimode-core fiber being fused together to be in optical contact with each other in a coupling region to allow optical power transfer between an inner cladding of the double-cladding fiber and the multimode-core fiber, wherein an outer cladding of the double-cladding fiber and a jacket of the multimode-core fiber are stripped away in the coupling region to allow optical contact or fusion of the inner cladding of the double-cladding fiber and the multimode-core fiber.

13. The optical diplexer recited in claim 12, wherein an optical coupling is achieved between the inner cladding of the double-cladding fiber and the multimode-core fiber without causing significant perturbation of light propagating in the double-cladding fiber core.

14. The optical diplexer recited in claim 12, wherein the optical transmitter source couples to the core of the double-cladding fiber such that no significant light loss occurs for the transmit light propagating through the core of the double cladding.

15. A monostatic laser system based on a fiber-coupled micro-lens structure, comprising:
   a multimode fiber with its lens face facing a fiber side of a receiver lens, and a receiver face of the multimode fiber facing a receiver photodiode;
   a transmitter fiber having a core with its lens face facing a fiber side of a transmitter lens, and a transmitter face of the transmitter fiber facing an optical transmitter source;
   a double-cladding fiber having a core with its lens face facing a fiber side of an output lens, and an output face of the double-cladding fiber facing an output side; and
   a diplexer based on an angled mirror configured in relation to said transmitter lens, receiver lens and output lens, wherein said transmitter lens and said output lens are arranged in an imaging configuration, where a near-field intensity distribution from the core of the transmitter fiber is first imaged by said transmitter lens at half-point between said transmitter lens and said output lens, where transmitted light from said optical transmitter source passes through a hole in said angled mirror.

16. The monostatic laser system recited in claim 15, wherein the transmitted light is imaged onto the lens face of the double-cladding fiber by the output lens, wherein if the cores of the transmitter and the double-cladding fiber are identical, then a high core-to-core coupling efficiency can be achieved with 1:1 imaging magnification, but for dissimilar core diameters other magnification factors are used to match the mode field diameters of the fiber cores.

17. The monostatic laser system recited in claim 15, wherein an image of a near-field distribution of the double-cladding fiber is imaged onto the angled mirror by the output lens, reflected and re-imaged onto the lens face multimode fiber by the receiver lens, thereby a received light emerging from the inner cladding of the double-cladding fiber is imaged onto the lens face of the multimode fiber by the output and receiver lens pair.

* * * * *